US010745583B2

(12) United States Patent
Zhan et al.

(10) Patent No.: US 10,745,583 B2
(45) Date of Patent: Aug. 18, 2020

(54) AQUEOUS COATING COMPOSITION AND METHOD OF PREPARING THE SAME

(71) Applicants: Dow Global Technologies LLC, Midland, MI (US); Rohm and Haas Company, Collegeville, PA (US)

(72) Inventors: Fu Zhan, Shanghai (CN); Caiyun Li, Shanghai (CN); Yaobang Li, Shanghai (CN); Jinyuan Zhang, Shanghai (CN); Jiansheng Feng, Shanghai (CN); Xiangting Dong, Shanghai (CN); Qian Shen, Shanghai (CN)

(73) Assignees: Dow global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 93 days.

(21) Appl. No.: 16/094,917

(22) PCT Filed: May 13, 2016

(86) PCT No.: PCT/CN2016/081949
§ 371 (c)(1),
(2) Date: Oct. 19, 2018

(87) PCT Pub. No.: WO2017/193354
PCT Pub. Date: Nov. 16, 2017

(65) Prior Publication Data
US 2019/0119522 A1    Apr. 25, 2019

(51) Int. Cl.
| | | |
|---|---|---|
| *C09D 175/04* | (2006.01) | |
| *C08K 3/36* | (2006.01) | |
| *C09D 133/08* | (2006.01) | |
| *C09D 133/10* | (2006.01) | |
| *C09D 7/61* | (2018.01) | |
| *C09D 133/12* | (2006.01) | |
| *C08L 33/12* | (2006.01) | |
| *C08L 75/04* | (2006.01) | |
| *C08F 283/00* | (2006.01) | |
| *C08G 18/08* | (2006.01) | |
| *C09D 7/40* | (2018.01) | |

(52) U.S. Cl.
CPC ........ *C09D 175/04* (2013.01); *C08F 283/006* (2013.01); *C08G 18/0866* (2013.01); *C08K 3/36* (2013.01); *C09D 7/61* (2018.01); *C09D 7/67* (2018.01); *C09D 7/68* (2018.01); *C09D 133/08* (2013.01); *C09D 133/10* (2013.01); *C09D 133/12* (2013.01); *C08K 2201/005* (2013.01); *C08L 33/12* (2013.01); *C08L 75/04* (2013.01)

(58) Field of Classification Search
CPC .......... C09D 175/04; C09D 7/61; C09D 7/67; C09D 7/68; C09D 133/08; C09D 133/10; C09D 133/12; C08F 283/006; C08G 18/0866; C08K 3/36; C08K 2201/005; C08L 33/12; C08L 75/04
USPC .......................................... 524/847
See application file for complete search history.

(56) References Cited

U.S. PATENT DOCUMENTS

| | | | |
|---|---|---|---|
| 6,348,537 B2 * | 2/2002 | Sugamoto | ............. C08F 290/06 524/493 |
| 6,538,059 B1 | 3/2003 | Muller et al. | |
| 7,601,776 B2 | 10/2009 | Kim et al. | |
| 9,127,125 B2 | 9/2015 | Hartig et al. | |
| 2004/0034146 A1 | 2/2004 | Gertzmann et al. | |
| 2006/0251901 A1 | 11/2006 | Armstrong et al. | |
| 2016/0115349 A1 | 4/2016 | Dong et al. | |

FOREIGN PATENT DOCUMENTS

| | | |
|---|---|---|
| CN | 1155638 C | 6/2004 |
| CN | 101302276 B | 10/2012 |
| CN | 102408826 B | 4/2013 |
| CN | 103614026 A | 3/2014 |
| CN | 104004425 A | 8/2014 |
| EP | 2727949 A1 | 5/2014 |
| JP | 2009234009 A | 10/2009 |
| JP | 2013040259 A | 2/2013 |
| JP | 2016040361 A | 3/2016 |
| JP | 2016535875 A | 11/2016 |
| WO | 2014190516 A1 | 12/2014 |
| WO | 2015058344 A1 | 4/2015 |

OTHER PUBLICATIONS

Supplementary European Search Report for the corresponding Application No. EP16901309; dated Feb. 28, 2020; 5 pages.
Japanese Office Action for the corresponding Japanese Application No. 2018-555136; filed Oct. 19, 2018. English translation, 3 pages.

* cited by examiner

*Primary Examiner* — William K Cheung
(74) *Attorney, Agent, or Firm* — Karl E. Stauss; Cantor Colburn LLP

(57) ABSTRACT

An aqueous coating composition providing the resulting coatings with balanced flexibility and anti-tacky properties, and a method of preparing the aqueous coating composition.

14 Claims, No Drawings

AQUEOUS COATING COMPOSITION AND METHOD OF PREPARING THE SAME

The application is a national stage entry of PCT International Application No. PCT/CN2016/081949, filed on May 13, 2016.

FIELD OF THE INVENTION

The present invention relates to an aqueous coating composition and a method of preparing the same.

INTRODUCTION

Aqueous acrylic polymer emulsions are used in a wide range of coating applications. For example, acrylic emulsion polymers can be used for adhesion and early film softness development in applications such as leather basecoats. However, these polymers have limited use in leather topcoats which require balanced flexibility and anti-tacky properties. After each application of a topcoat, the leathers are generally stacked overnight. This is possible only if the freshly applied topcoat does not stick to the adjacent leather article in the stack after drying. Thus, an anti-tacky topcoat is desirable. Simply increasing the glass transition temperature ($T_g$) of acrylic emulsion polymers may solve the tacky problem but adversely impacts the softness of the polymers, and the resulting flexibility and soft feel of the coatings they produce.

WO/2014/190516 discloses a coating composition comprising: i) an acrylic polymer dispersion, wherein the acrylic polymer has a $T_g$ of from 25° C. to 80° C., and ii) a polyurethane/acrylic hybrid with a $T_g$ of from −55° C. to 0° C.; wherein the composition has a minimum film formation temperature of lower than 10° C. This cold blended composition provides a coating with desired water repellency. However, such coating is not suitable for leather topcoats due to unsatisfactory flexibility.

Therefore, there remains a need to provide a coating composition, particularly for use in leather topcoats, that provides the resulting coatings with balanced flexibility and anti-tacky properties.

SUMMARY OF THE INVENTION

The present invention provides a novel aqueous coating composition that provides the resulting coatings with the above described balanced flexibility and anti-tacky properties, for example, a shore A hardness less than 80 according to the GB/T2411-2008 method and an anti-tacky rating of 3.5 or above, according to the test method described in the Examples section below.

In a first aspect, the present invention is an aqueous coating composition comprising:

colloidal silica and a polyurethane-acrylic polymer,
wherein the colloidal silica is present in an amount of from 5% to 30% by solids weight, based on the total solids weight of the colloidal silica and the polyurethane-acrylic polymer, and has an average particle size less than 150 nm;
wherein the polyurethane-acrylic polymer is present in an amount of from 70% to 95% by solids weight, based on the total solids weight of the colloidal silica and the polyurethane-acrylic polymer, and is obtained by forming an acrylic polymer in an aqueous medium by an emulsion polymerization in the presence of a polyurethane;
wherein the acrylic polymer having a $T_g$ of from −13° C. to 10° C. comprises as polymerized units, based on the weight of the acrylic polymer,
(i) from 0.5% to 4% by weight of an ethylenically difunctional or multifunctional compound, and
(ii) from 96% to 99.5% by weight of an ethylenically monofunctional compound; and
wherein the weight ratio of polyurethane to acrylic polymer in the polyurethane-acrylic polymer is from 30/70 to 99/1.

In a second aspect, the present invention is a method of preparing the aqueous coating composition of the first aspect. The method comprises: admixing the colloidal silica and the polyurethane-acrylic polymer.

DETAILED DESCRIPTION OF THE INVENTION

"Aqueous" means that water or water mixed with 50% by weight or less, based on the weight of the mixture, of water-miscible solvent.

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

Glass transition temperature ($T_g$) values of acrylic polymers are those calculated by using the linear equation. For example, $T_g$ of an acrylic polymer comprising polymerized units of Monomer a, Monomer b and Monomer c, may be determined by:

$$T_g = W_a * T_{ga} + W_b * T_{gb} + W_c * T_{gc}$$

wherein $T_{ga}$, $T_{gb}$, and $T_{gc}$ refer to the $T_g$ of homopolymer of Monomer a, Monomer b, and Monomer c, respectively; and $W_a$, $W_b$, and $W_c$ refer to the weight fraction of Monomer a, Monomer b, and Monomer c, based on the weight of total monomers, respectively.

The aqueous coating composition of the present invention comprises colloidal silica and a polyurethane-acrylic polymer.

The colloidal silica herein refers to a dispersion of silica particles, which are typically dispersed in water, suitably in the presence of stabilizing cations such as $K^+$, $Na^+$, $Li^+$, $NH_4^+$, organic cations; primary, secondary, tertiary, and quaternary amines; or mixtures thereof. Preferably, the colloidal silica particles are negatively charged. Colloidal silica may be derived from, for example, precipitated silica, fumed silica, pyrogenic silica or silica gels, and mixtures thereof. Silica content of the colloidal silica may be present, based on the weight of colloidal silica, from 20% to 80% by weight, from 25% to 70% by weight, or from 30% to 60% by weight. The higher the silica content, the more concentrated the resulting colloidal silica dispersion will become. The pH value of the colloidal silica may be from 1 to 13, from 6 to 12, or from 7.5 to 11.

The colloidal silica useful in the present invention may have an average particle size less than 150 nanometers (nm), 100 nm or less, or ranging from 2 nm to 70 nm, or from 5 nm to 50 nm. The average particle size of the colloidal silica may be determined according to the HG/T 2521-2008 method. For example, one and half (1.50) grams (g) of colloidal silica are mixed with 100 g of deionized water in a beaker. The pH value of the resulting dispersion is adjusted to 3~3.5 with HCl or NaOH solutions. 30 g of NaCl are further added into the obtained dispersion, followed by adding deionized water to adjust the dispersion volume to 150 ml and to fully dissolve NaCl. The obtained dispersion is then titrated using a standard NaOH solution (about 0.1 mol/L). The accurate concentration of the standard NaOH used in the test is recorded and denoted as c. The volume of NaOH standard solution used for pH shifting from 4.00~9.00 is recoded and denoted as V. The average particle size in nanometer, denoted as D, is determined by:

$$D=2727/(320Vc-25).$$

The colloidal silica may be present in the coating composition, by solids weight based on the total solids weight of the colloidal silica and the polyurethane-acrylic polymer, in an amount of 5% or more or 7% or more, and at the same time, 30% or less, 20% or less, or even 15% or less.

The aqueous coating composition of the present invention further comprises a polyurethane-acrylic polymer, which is typically in the form of an aqueous polyurethane-acrylic polymer dispersion. The polyurethane-acrylic polymer useful in the present invention may be obtained by forming an acrylic polymer in an aqueous medium by an emulsion polymerization in the presence of a polyurethane. The preparation of the polyurethane-acrylic polymer may be conducted by first providing a polyurethane, preferably a polyurethane dispersion, and then loading and polymerizing monomers used to make the acrylic polymer in the presence of the polyurethane to obtain the polyurethane-acrylic polymer dispersion.

The polyurethane useful in the present invention may be prepared by reacting one or more polyols with one or more polyisocyanates.

"Polyol" refers to any product having two or more hydroxyl groups per molecule. Polyols useful in preparing the polyurethane may include polyether diols, polyester diols, multi-functional polyols, or mixtures thereof. The polyols may be selected from polyether polyols, polyester polyols, polycarbonate polyols, or mixtures thereof.

The polyether polyols useful in preparing the polyurethane may contain a —C—O—C— group. They can be obtained by reacting starting compounds that contain reactive hydrogen atoms such as water or diols, with alkylene oxides such as ethylene oxide, propylene oxide, butylene oxide, styrene oxide, tetrahydrofuran, epichlorohydrin, or mixtures thereof. Preferred polyether polyols include poly (propylene glycol) with a molecular weight of from 400 to 3,000, polytetrahydrofuran and copolymers of poly(ethylene glycol) and poly(propylene glycol). The diols useful in preparing the polyether polyols may include alkylene glycols, preferably ethylene glycol, diethylene glycol and butylene glycol.

The polyester polyols useful in preparing the polyurethane are typically esterification products prepared by the reaction of organic polycarboxylic acids or their anhydrides with a stoichiometric excess of a diol(s). Examples of suitable polyester polyols useful in preparing the polyurethane include poly(glycol adipate), poly(ethylene terephthalate) polyols, polycaprolactone polyols, alkyd polyols, orthophthalic polyols, sulfonated and phosphonated polyols, and the mixture thereof. The diols useful in preparing the polyester polyols include those described above for preparing the polyether polyols. Suitable carboxylic acids useful in preparing the polyester polyols may include dicarboxylic acids, tricarboxylic acids and anhydrides, such as maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, or mixtures thereof. Preferred polycarboxylic acids useful in preparing the polyester polyols include aliphatic and aromatic dibasic acids.

Polyisocyanates useful in preparing the polyurethane have two or more isocyanate groups on average, preferably two to four isocyanate groups per molecule. Polyisocyanates typically comprise about 5 to 20 carbon atoms and include aliphatic, cycloaliphatic, aryl-aliphatic, and aromatic polyisocyanates, oligomer thereof, or mixtures thereof. Preferred polyisocyanates are diisocyanates such as toluene diisocyanate, hexamethylene isocyanate and isophorone isocyanate.

Suitable aliphatic polyisocyanates may include, for example, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the mixture thereof. Preferred aliphatic polyisocyanates are hexamethylene-1,6-diisocyanate, 2,2,4-trimethyl-hexamethylene-diisocyanate, 2,4,4-trimethyl-hexamethylene diisocyanate, or mixtures thereof. Examples of suitable cycloaliphatic polyisocyanates include dicyclohexylmethane diisocyanate (for example, DESMODUR polyisocyanates from Covestro), isophorone diisocyanate, 1,4-cyclohexane diisocyanate, 1,3-bis-(isocyanatomethyl)cyclohexane, or mixtures thereof. Preferred cycloaliphatic polyisocyanates are selected from dicyclohexylmethane diisocyanate and isophorone diisocyanate. Examples of suitable araliphatic polyisocyanates include m-tetramethyl xylylene diisocyanate, p-tetramethyl xylylene diisocyanate, 1,4-xylylene diisocyanate, 1,3-xylylene diisocyanate, or mixtures thereof. A preferred araliphatic polyisocyanate is tetramethyl xylylene diisocyanate. Examples of suitable aromatic polyisocyanates include 4,4'-diphenylmethylene diisocyanate, toluene diisocyanate, their isomers, naphthalene diisocyanate, their oligomeric forms, or mixtures thereof. A preferred aromatic polyisocyanate is toluene diisocyanate.

The polyurethane useful in the present invention may have a $T_g$ of 0° C. or lower, −20° C. or lower, or even −30° C. or lower. $T_g$ of the polyurethane may be determined by differential scanning calorimetry (DSC).

The polyurethane useful in the present invention may have a hydroxyl (OH) number of from 0 to 50, for example, 40 or less or 30 or less, according to the ASTM D 1957 method.

The polyurethane useful in the present invention may have an acid number of from 10 to 100, for example, 10 or more, 15 or more, or even 20 or more, according to the ASTM D 974 method.

The polyurethane useful in the present invention may also have a number average molecular weight of 2,000 or more, 4,000 or more, or even 10,000 or more as measured by gel permeation chromatography (GPC) with polystyrene standard.

The polyurethane dispersion useful in the present invention may be prepared by techniques known in the art, for example, first preparing a polyurethane by reacting at least one polyol and at least one polyisocyanate described above, optionally in the presence of a catalyst, a solvent or mixtures thereof; dispersing the obtained polyurethane in water typically in the presence of a surfactant; and optionally adding polyamines before, during and/or after dispersing the polyurethane in water. Suitable commercially available polyurethane dispersions include, for example, BAYDERM™ Finish 91UD polyurethane dispersion available from The Dow Chemical Company (BAYDERM is a trademark of The Dow Chemical Company).

The acrylic polymer in the polyurethane-acrylic polymer may comprise, as polymerized units, one or more ethylenically difunctional or multifunctional compounds. Examples of suitable ethylenically difunctional or multifunctional compounds include allyl (meth)acrylate, hexanediol di(meth)arcylate, ethylene glycol di(meth)acrylate, neopentyl glycol di(meth)acrylate, butanediol di(meth)acrylate, trimethylolpropane tri(meth)acrylate, divinyl benzene, or mixtures thereof. The ethylenically difunctional or multifunctional compound may be present as polymerized units, by weight based on the weight of the acrylic polymer, 0.5% or more, 1% or more, or even 1.5% or more, and at the same time, 4% or less, 3% or less, or even 2.5% or less.

The acrylic polymer in the polyurethane-acrylic polymer may comprise, as polymerized units, one or more ethylenically monofunctional compounds. The ethylenically monofunctional compounds may be selected from (meth)acrylic acid alkyl esters, α, β-ethylenically unsaturated carboxylic acids, vinyl aromatic compounds such as styrene, or mixtures thereof. Examples of suitable ethylenically monofunctional compounds include (meth)acrylic acid alkyl esters such as methyl (meth)acrylate, ethyl (meth)acrylate, butyl (meth)acrylate, 2-ethylhexyl (meth)acrylate, lauryl (meth)acrylate, isobornyl (meth)acrylate, or cyclohexyl (meth)acrylate; acid-bearing monomers such as (meth)acrylic acid, itaconic acid, fumaric acid, or salts thereof; and phosphorous-containing acid monomers such as phosphoalkyl (meth)acrylates such as phosphoethyl (meth)acrylate, phosphopropyl (meth)acrylate, phosphobutyl (meth)acrylate, salts thereof; or mixtures thereof. Preferred ethylenically monofunctional compounds are (meth)acrylic acid alkyl esters. More preferably, the ethylenically monofunctional compound is selected from methyl methacrylate, ethyl acrylate, butyl acrylate, 2-ethylhexyl acrylate, or mixtures thereof. The ethylenically monofunctional compound may be present as polymerized units, based on the weight of the acrylic polymer, in an amount of 96% to 99.5% by weight, or from 97.5% to 98.5% by weight. In one embodiment, the acrylic polymer comprises, based on the weight of the acrylic polymer, from 25% to 50% by weight of methyl methacrylate, and from 50% to 75% by weight of butyl acrylate, 2-ethylhexyl acrylate, or mixtures thereof.

The acrylic polymer in the polyurethane-acrylic polymer may have a $T_g$ of −13° C. or more, −10° C. or more, or even −8° C. or more, and at the same time, 10° C. or lower, 5° C. or lower, or even 0° C. or lower. $T_g$ values of the acrylic polymer may be calculated by using the linear equation described above.

The weight ratio of polyurethane to acrylic polymer in the polyurethane-acrylic polymer may be from 30/70 to 99/1, from 35/65 to 75/25, or from 40/60 to 60/40.

The polyurethane-acrylic polymer useful in the present invention may be present, by solids weight based on the total solids weight of the colloidal silica and the polyurethane-acrylic polymer, in an amount of 70% or more or 75% or more, and at the same time, 95% or less, 90% or less, or even 85% or less.

The combined content of the colloidal and the polyurethane-acrylic polymer in the aqueous coating composition may be, by solids weight based on the total solids weight of the coating composition, 20% or more, 50% or more, 65% or more, or even 80% or more, and at the same time, 100% or less, 98% or less, or even 95% or less.

The polyurethane-acrylic polymer useful in the present invention may be prepared by emulsion polymerization of monomers used to prepare the acrylic polymer in an aqueous medium in the presence of the polyurethane. Emulsion polymerization techniques for preparing the acrylic polymer are well known in the art. Monomers refer to the compounds described above used to make the acrylic polymer, i.e., form the polymerized units of the acrylic polymer after polymerization. Monomers for preparing the acrylic polymer may include the ethylenically monofunctional compound and the ethylenically difunctional or multifunctional compounds described above. The ethylenically difunctional or multifunctional compound may be used, by weight based on the total weight of monomers, 0.5% or more, 1% or more, or even 1.5% or more, and at the same time, 4% or less, 3% or less, or even 2.5% or less. The ethylenically monofunctional compound may be used, based on the total weight of monomers, in an amount of 96% to 99.5% by weight, or from 97.5% to 98.5% by weight. Total weight concentration of the monomers used to prepare the acrylic polymer is equal to 100%.

In preparing the polyurethane-acrylic polymer, the polyurethane, preferably the polyurethane dispersion, is first provided, then a mixture of monomers for preparing the acrylic polymer is added neat or as an emulsion in water; or added in one or more additions or continuously, linearly or nonlinearly, over the reaction period of preparing the acrylic polymer, or combinations thereof. Temperature suitable for emulsion polymerization processes may be lower than 100° C., in the range of from 15 to 95° C., or in the range of from 30 to 90° C. Multistage free-radical polymerization using the monomers described above can be used, which at least two stages are formed sequentially, and usually results in the formation of the multistage polymer comprising at least two polymer compositions.

In the emulsion polymerization, free radical initiators may be used. The emulsion polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the emulsion polymerization, a surfactant may be used. The surfactant may be added prior to or during the polymerization of the monomers, or combinations thereof. A portion of the surfactant can also be added after the polymerization. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The surfactant used is usually from 0.1% to 6% by weight or from 0.3% to 1.5% by weight, based on the weight of total monomers used to prepare the acrylic polymer.

In the emulsion polymerization, a chain transfer agent may be used. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the acrylic polymer, for example, from 0 to 1.5% by weight, from 0.03% to 1% by weight, or from 0.05% to 0.5% by weight, based on the total weight of monomers used to prepare the acrylic polymer.

After completing the polymerization of the acrylic polymer, the obtained polyurethane-acrylic polymer may be neutralized by one or more bases as neutralizers to a pH value, for example, at least 6, from 6 to 10, or from 7 to 9. The bases may lead to partial or complete neutralization of the ionic or latently ionic groups of the acrylic polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

In addition to the colloidal silica and the polyurethane-acrylic polymer, the aqueous coating composition may further comprise a polyurethane dispersion. Examples of suitable polyurethane dispersions may include dispersions of polyurethanes used in preparation of the polyurethane-acrylic polymer described above. The polyurethane dispersion may be present in the aqueous coating composition, by solids weight based on the total solids weight of the coating composition, from 0 to 80%, from 5% to 50%, or from 10% to 40%.

The aqueous coating composition of the present invention may further comprise one or more thickeners. The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is HEUR. The concentration of the thickener may be, based on the total weight of the aqueous coating composition, generally from 0 to 5% by weight, from 0.01% to 3% by weight, or from 0.1% to 1% by weight.

The aqueous coating composition of the present invention may further comprise one or more leveling agents. Examples of suitable leveling agents include polydimethylsiloxane, modified polydimethylsiloxane, polyacrylate, fluorocarbon surfactant, or mixtures thereof. The concentration of the leveling agents may be, based on the total weight of the coating composition, from 0 to 5% by weight, from 0.01% to 3% by weight, or from 0.1% to 1% by weight.

The aqueous coating composition of the present invention may further comprise one or more coalescents. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. The concentration of the coalescents may be, based on the total weight of the coating composition, from 0 to 15% by weight, from 0.01% to 10% by weight, or from 0.1% to 5% by weight.

The aqueous coating composition of the present invention may further comprise pigments and/or extenders. "Pigments" herein refer to materials that can provide whiteness and color including inorganic pigments and organic pigments. Inorganic pigments typically include metal oxides. Examples of suitable metal oxides include titanium dioxide (TiO2), zinc oxide, iron oxide, zinc sulfide, barium sulfate, barium carbonate, or mixture thereof. In a preferred embodiment, pigment used in the present invention is TiO2. "Extenders" herein refer to white transparent or semi-transparent components, whose purpose is to reduce the cost of the coating by increasing the area covered by a given weight of pigment. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, or mixtures thereof. The concentration of the pigments and/or extenders may be, based on the total weight of the coating composition, from 0 to 60% by weight, from 5% to 35% by weight, or from 10% to 30% by weight.

In addition to the components described above, the aqueous coating composition of the present invention may further comprise any one or combination of the following additives: dispersants, humectants, mildewcides, biocides, anti-skinning agents, anti-oxidants, plasticizers, adhesion promoters, and grind vehicles. These additives may be present in a combined amount of from 0 to 10% by weight, or from 0.01% to 2% by weight, based on the total weight of the coating composition.

The aqueous coating composition of the present invention may further comprise one or more crosslinking agents. Examples of suitable crosslinking agents include polyfunctional aziridines or polyisocyanates, such as those described above in preparing the polyurethane, preferably their oligomeric forms. The concentration of the crosslinking agent may be, based on the total weight of the coating composition, from 0 to 15% by weight, from 1% to 10% by weight, or from 2% to 8% by weight.

Preferably, the aqueous coating composition of the present invention comprises, (a) from 7.5% to 15% by solids weight of colloidal silica, based on the total solids weight of the colloidal silica and the polyurethane-acrylic polymer, wherein the colloidal silica has an average particle size less than 50 nm; and (b) from 85% to 92.5% by solids weight of a polyurethane-acrylic polymer dispersion, based on the total solids weight of the colloidal silica and the polyurethane-acrylic polymer;

wherein the polyurethane-acrylic polymer is obtained by:

forming an acrylic polymer in an aqueous medium by an emulsion polymerization in the presence of a polyurethane, wherein the acrylic polymer has a $T_g$ of from −10° C. to 0° C. and comprises as polymerized units, based on the weight of the acrylic polymer, (i) from 1.5% to 2.5% by weight of an ethylenically difunctional or multifunctional compound, and (ii) from 97.5% to 98.5% by weight of an ethylenically monofunctional compound;

wherein the weight ratio of polyurethane to acrylic polymer is from 60/40 to 35/75.

The solids content of the aqueous coating composition may be from 10% to 60% by weight, from 15% to 50% by weight, or from 15% to 45% by weight, based on the weight of the coating composition.

The aqueous coating composition of the present invention may be prepared by mixing the polyurethane-acrylic polymer dispersion and the colloidal silica with other optional components, for example, thickeners, leveling agents and/or crosslinking agents as described above. Components in the aqueous coating composition may be mixed in any order to provide the aqueous coating composition of the present invention. Any of the above-mentioned optional components may also be added to the composition during or prior to the mixing to form the aqueous coating composition.

The present invention also provides a method of preparing a coating. The method may comprise: forming the aqueous coating composition of the present invention, applying the aqueous coating composition to a substrate, and drying, or allowing to dry, the applied coating composition to form the coating. The aqueous coating composition of the present invention provides coatings with anti-tacky rating of 3.5 or above, or 4 or above, according to the test method described in the Examples section below, and at the same time, good flexibility as determined by a shore A hardness less than 80, according to the GB/T2411-2008 method.

The aqueous coating composition of the present invention can be applied to, and adhered to, various substrates, particularly, flexible substrates, including leather such as natural leather, artificial leather, synthetic leather, and vinyl leather; paper, cardboard, paperboard, woven and non-woven textiles, wood, metals, and plastics such as polyurethanes, polyvinyl chlorides, polyolefins, and polyamides. After the coating composition has been applied to a substrate, the coating composition can dry, or allow to dry, to form a film (this is, coating) at room temperature (20-25° C.), or at an elevated temperature, for example, from 35° C. to 120° C.

The aqueous coating composition of the present invention can be applied to a substrate by any means known in the art, including brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used.

The aqueous coating composition is particularly suitable for leather coatings. The aqueous coating composition may be applied to leather such as, for example, mineral tanned or vegetable tanned leather including full-grain leather, buffed or corrected-grain leather, and split leather with or without a prior treatment with an impregnating resin mixture and with or without the application of subsequent coatings. The aqueous coating composition can be applied directly onto leather or indirectly coated over a primer layer. The primer can be a conventional primer comprising a (meth)acrylic polymer, a polyurethane, a polyacrylonitrile, a polybutadiene, a polystyrene, a polyvinyl chloride, a polyvinylidene chloride, a polyvinyl acetate, or a combination thereof.

EXAMPLES

Some embodiments of the invention will now be described in the following Examples, wherein all parts and percentages are by weight unless otherwise specified. The following materials are used in the examples:

BAYDERM Finish 91UD dispersion ("91UD"), available from The Dow Chemical Company, is a polyurethane dispersion.

Sodium lauryl sulfate ("SLS"), available from The Dow Chemical Company, is used as a surfactant.

Methyl methacrylate ("MMA"), butyl acrylate ("BA"), 2-ethylhexyl acrylate ("2-EHA"), allyl methacrylate ("ALMA"), and glycidyl methacrylate ("GMA") are monomers all available from The Dow Chemical Company.

t-Butyl hydroperoxide ("t-BHP") and isoascorbic acid ("IAA"), both available from The Dow Chemical Company, are used as initiators.

BINDZIL 2040 colloidal silica, available from AkzoNobel, has an average particle size of 20 nm.

BRUGGOLITE FF6 ("FF6"), available from Brueggemann Chemical, is used as a reductant.

The following standard analytical equipment and methods are used in the Examples.

Preparation of Films

Twenty (20) g of aqueous coating compositions (solids: 20% by weight) were charged into a petri dish (diameter: 9.5 cm) and then dried in an oven at 48° C. for 48 hours to form a film. The dish was removed from the oven and allowed to cool. The film was then carefully peeled off from the dish. The obtained film was hung in a constant temperature and humidity room (CTR) for 24 hours before testing for anti-tacky and flexibility properties.

Anti-Tacky Test

The as prepared film was folded face to face and pressed together between fingers. The film was then rated for anti-tacky properties on a scale of 1 to 5, by measuring the time duration for separation of blocked surface without any force and listening for the sound produced upon the separation. The rating system is defined in the table below, whereby ratings of 0-3 are considered a fail while ratings of 3.5 and higher are acceptable ratings for anti-tacky performance.

| Anti-tacky rating | Description |
|---|---|
| 1 | Blocked surfaces of the film can't be separated without any force |
| 1.5 | Block surfaces of the film separate from each other without any force after >10 seconds |

-continued

| Anti-tacky rating | Description |
|---|---|
| 2 | Blocked surfaces of the film separate from each other without any force after 3~10 seconds |
| 2.5 | Blocked surfaces of the film separate from each other without any force after more than 0.5 second and <3 seconds |
| 3 | Blocked surfaces of the film separate from each other immediately with obvious sound |
| 3.5 | Blocked surfaces of the film separate from each other immediately with some sound |
| 4 | Blocked surfaces of the film separate from each other immediately with little sound |
| 4.5 | Blocked surfaces of the film separate from each other immediately with very little sound |
| 5 | Blocked surfaces of the film separate from each other immediately without any sound |

Flexibility

The flexibility of the as prepared film was evaluated by a Shore A hardness. The shore A hardness was measured according to the GB/T2411-2008 method. The film was cut into square samples with dimensions of 1×1 cm. The samples were then stacked to the total height of 1 cm for the hardness measurement. The Shore A hardness being less than 80 means acceptable flexibility.

Synthesis of Polyurethane-Acrylic Polymer (PUA) Dispersion 1

607.5 g of 91UD (40% solid) and 280 g of deionized water were added into a three-necked flask and stirred under nitrogen ($N_2$) purge for 30 minutes (min).

13.02 g of SLS (28% solid) and 89 g of deionized water were added into a monomer tank. Then total 366 g of monomers (29 MMA/69BA/2ALMA by weight percent) were added with agitation to form a stable monomer emulsion. Half of the monomer emulsion was fed to the flask at 28-32° C. for 25 min and hold for 30 min. At a reactor temperature of 23-28° C., 0.38 g of $FeSO_4$ solution (1%), 2.8 g of edetic acid (EDTA) solution (1%), 0.21 g of t-BHP solution (70%) and 14 g of FF6 solution (1%) were added into the flask and reacted for 15 min. Then the other half of the monomer emulsion was added into the flask for 25 min and hold for 30 min. 0.21 g of t-BHP solution (70%) and 14 g of FF6 solution (1%) were further added into the flask and reacted for 35 min. Then 1.17 g of t-BHP solution (70%) and 70 g of FF6 solution (1%) were added into the flask and reacted for 35 min. After cooling down to room temperature, the emulsion was filtered with a 100-mesh filter to obtain a PUA dispersion. Properties of the obtained PUA Dispersion 1 are given in Table 1.

Synthesis of PUA Dispersion 2

915 g of 91UD (40% solid) and 280 g of deionized water were added into a three-necked flask and stirred under $N_2$ purge for 30 min.

13.02 g of SLS (28% solid) and 89 g of deionized water were added into a monomer tank. Then total 366 g of monomers (29 MMA/69BA/2ALMA by weight percent) were added with agitation to form a stable monomer emulsion. Half of the monomer emulsion was fed to the flask at 28~32° C. for 25 min and hold for 30 min. At a reactor temperature of 23~28° C., 0.38 g of $FeSO_4$ solution (1%), 2.8 g of EDTA solution (1%), 0.21 g of t-BHP solution (70%) and 14 g of FF6 solution (1%) were added into the flask and reacted for 15 min. Then the other half of the monomer emulsion was added into the flask for 25 min and hold for 30 min. 0.21 g of t-BHP solution (70%) and 14 g of FF6 solution (1%) were further added into the flask and reacted for 35 min. Then 1.17 g of t-BHP solution (70%) and 70 g of FF6 solution (1%) were added into the flask and reacted for 35 min. After cooling down to room temperature, the emulsion was filtered with a 100-mesh filter to obtain a PUA dispersion. Properties of the obtained PUA Dispersion 2 are given in Table 1.

Synthesis of PUA Dispersion 3

The PUA Dispersion 3 was prepared according to the same procedure as described above for preparing PUA Dispersion 1, except that the monomer emulsion composition used was 20.6MMA/77.4BA/2ALMA by weight percent. Properties of the obtained PUA Dispersion 3 are given in Table 1.

Synthesis of PUA Dispersion 4

The PUA Dispersion 4 was prepared according to the same procedure as described above for preparing PUA Dispersion 2, except that the monomer emulsion composition used was 50.9MMA/47.1EHA/2GMA by weight percent. Properties of the obtained PUA Dispersion 4 are given in Table 1.

Synthesis PUA Dispersion 5

The PUA Dispersion 5 was synthesized according to substantially the same process as that for preparing polymer dispersion 9 in U.S. Pat. No. 6,538,059B1, except that 91UD was used as the polyurethane dispersion.

341.14 g of 91UD were charged into a 3 L reaction vessel with a reflux condenser. 401.08 g of butyl acrylate, 8.21 g of allyl methacrylate, 0.52 g of dimethylethanolamine and 507.27 g of deionized water were then added with stirring. A mixture of 1.22 g of ascorbic acid and 42.62 g of deionized water and a mixture of 0.00407 g of iron (II) sulfate and 40.92 g of deionized water were added. Then a mixture of 2.04 g of tert-butyl hydroperoxide (70% strength in water) and 46.69 g of deionized water was metered in over the course of 10 min and the polymerization was initiated. After reaching exothermic peak, the reaction was hold for 1 hour, and then cooled down to room temperature. The resulting dispersion was filtered with 325 mesh filter and removed 7.0 g of undesirable wet gel to give the PUA Dispersion 5. The obtained PUA Dispersion 5 was evaluated and properties are given in Table 1.

Synthesis of PUA Dispersion 6

The PUA Dispersion 6 was prepared according to the same procedure as described above for preparing PUA Dispersion 1, except that the monomer emulsion composition used was 55EHA/43MMA/2ALMA by weight percent. Properties of the obtained PUA Dispersion 6 are given in Table 1.

Synthesis of PUA Dispersion 7

The PUA Dispersion 7 was prepared according to the same procedure as described above for preparing PUA Dispersion 1, except that the monomer emulsion composition used was 44MMA/55EHA/1GMA by weight percent. Properties of the obtained PUA Dispersion 7 are given in Table 1.

Examples (Exs) 1-5

The pH value of the PUA dispersion obtained above was adjusted with ammonia to reach above 9. A certain dosage of BINDZIL 2040 colloidal silica was then added into 100 g of the PUA dispersion with agitation at room temperature, based on formulations described in Table 2. Deionized water was further added to obtain aqueous coating compositions with solids content of 20% by weight. Properties of films formed by these aqueous coating compositions were measured according to the test methods described above and results of the properties are given in Table 2.

Comparative (Comp) Exs A-C, E, G, H and I

PUA dispersions were diluted with deionized water to obtain aqueous coating compositions with solids content of 20% by weight, based on formulations described in Table 2. Properties of films formed by these aqueous coating compositions were measured according to the test methods described above and results of the properties are given in Table 2.

Comp Exs D, F and J

Aqueous coating compositions of Comp Exs D, F and J were each prepared according to the same procedure as described above for preparing coating compositions of Ex 1, based on formulations described in Table 2. Properties of films formed by these aqueous coating compositions were measured according to the test methods described above and results of the properties are given in Table 2.

As shown in Table 2, films formed by the coating compositions of Exs 1-5 showed both good anti-tacky properties (rating 3.5 or above) and desired flexibility as indicated by shore A hardness less than 80. In contrast, the coating compositions of Comp Exs A-E and G-J provided coating films with unacceptable anti-tacky performance Coatings made from the coating compositions of Comp Exs E and F showed undesirably high shore A hardness, thus unacceptable flexibility.

TABLE 1

| PUA dispersion | $T_g$ of acrylic polymer | Monomer composition for preparing acrylic polymer (weight percentage) | PUD/Acrylic polymer weight ratio (solids/solids) |
| --- | --- | --- | --- |
| PUA Dispersion 1 | −5.3° C. | MMA/BA/ALMA = 29/69/2 | 40/60 |
| PUA Dispersion 2 | −5.3° C. | MMA/BA/ALMA = 29/69/2 | 50/50 |
| PUA Dispersion 3 | −16° C. | MMA/BA/ALMA = 20.6/77.4/2 | 40/60 |
| PUA Dispersion 4 | 12° C. | MMA/EHA/GMA = 50.9/47.1/2 | 50/50 |
| PUA Dispersion 5 | −42° C. | BA/ALMA = 98/2 | 25/75 |
| PUA Dispersion 6 | 1.6° C. | EHA/MMA/ALMA = 55/43/2 | 40/60 |
| PUA Dispersion 7 | 1.6° C. | MMA/EHA/GMA = 44/55/1 | 40/60 |

TABLE 2

| Coating Composition | PUA dispersion | BINDZIL 2040 dosage* | Anti-tacky property | Shore A hardness |
| --- | --- | --- | --- | --- |
| Comp Ex A | PUA Dispersion 1 | | 2.5 | 59 |
| Ex 1 | PUA Dispersion 1 | 15% | 3.5 | 74 |
| Comp Ex B | PUA Dispersion 2 | | 3 | 66 |
| Ex 2 | PUA Dispersion 2 | 15% | 4.5 | 74 |
| Ex 4 | PUA Dispersion 2 | 10% | 3.5 | 68 |
| Ex 5 | PUA Dispersion 2 | 20% | 4.5 | 77 |
| Comp Ex C | PUA Dispersion 3 | | 1 | 58 |
| Comp Ex D | PUA Dispersion 3 | 15% | 2 | 72 |
| Comp Ex E | PUA Dispersion 4 | | 2.5 | 84 |
| Comp Ex F | PUA Dispersion 4 | 15% | 3.5 | 90 |
| Comp Ex G | PUA Dispersion 5 | | 1 | NA |
| Comp Ex H | PUA Dispersion 6 | | 3 | 57 |
| Ex 3 | PUA Dispersion 6 | 15% | 4 | 67 |
| Comp Ex I | PUA Dispersion 7 | | 1 | 56 |
| Comp Ex J | PUA Dispersion 7 | 15% | 2 | NA |

*by solids weight based on the total solids weight of colloidal silica and PUA dispersion

What is claimed is:

1. An aqueous coating composition comprising:
colloidal silica and a polyurethane-acrylic polymer,
wherein the colloidal silica is present in an amount of from 5% to 30% by solids weight, based on the total solids weight of the colloidal silica and the polyurethane-acrylic polymer, and has an average particle size less than 150 nm;
wherein the polyurethane-acrylic polymer is present in an amount of from 70% to 95% by solids weight, based on the total solids weight of the colloidal silica and the polyurethane-acrylic polymer, and is obtained by forming an acrylic polymer in an aqueous medium by an emulsion polymerization in the presence of a polyurethane;
wherein the acrylic polymer having a Tg of from −13° C. to 10° C. comprises as polymerized units, based on the weight of the acrylic polymer,
(i) from 0.5% to 4% by weight of an ethylenically difunctional or multifunctional compound, and
(ii) from 96% to 99.5% by weight of an ethylenically monofunctional compound; and
wherein the weight ratio of polyurethane to acrylic polymer in the polyurethane- acrylic polymer is from 30/70 to 99/1.

2. The aqueous coating composition of claim 1, wherein the acrylic polymer has a Tg of from −10° C. to 0° C.

3. The aqueous coating composition of claim 1, wherein the colloidal silica is present in an amount of from 7.5% to 20% by solids weight, based on the total solids weight of the colloidal silica and the polyurethane-acrylic polymer.

4. The aqueous coating composition of claim 1, wherein the colloidal silica has an average particle size less than 100 nm.

5. The aqueous coating composition of claim 1, wherein the ethylenically
difunctional or multifunctional compound is selected from allyl (meth)acrylate, hexanediol di(meth)arcylate, ethylene glycol di(meth)acrylate, neopentyl glycol di(meth)acrylate, butanediol di(meth)acrylate, trimethylolpropane tri(meth)acrylate, or mixtures thereof.

6. The aqueous coating composition of claim 1, wherein the ethylenically monofunctional compound is selected from a (meth)acrylic acid alkyl ester, a vinyl aromatic compound, or mixtures thereof.

7. The aqueous coating composition of claim 6, wherein the ethylenically monofunctional compound is selected from butyl (meth)acrylate, iso-butyl (meth)acrylate, 2-ethylhexyl acrylate, lauryl (meth)acrylate, stearyl (meth)acrylate, or mixtures thereof.

8. The aqueous coating composition of claim 1, wherein the weight ratio of polyurethane to acrylic polymer in the polyurethane-acrylic polymer is from 35/65 to 60/40.

9. The aqueous coating composition of claim 1, wherein the combined content of the colloidal and the polyurethane-acrylic polymer is from 80% to 100% by solids weight, based on the total solids weight of the coating composition.

10. The aqueous coating composition of claim 1, wherein the polyurethane has a Tg of from −60° C. to 0° C.

11. The aqueous coating composition of claim 1, wherein the polyurethane has an OH number less than 50.

12. The aqueous coating composition of claim 1, further comprising a thickener, a leveling agent, a crosslinking agent, or mixtures thereof.

13. The aqueous coating composition of claim 1, wherein the colloidal silica is present in an amount of from 7.5% to 15% by solids weight, based on the total solids weight of the colloidal silica and the polyurethane-acrylic polymer, and has an average particle size less than 50 nm;
   wherein the polyurethane-acrylic polymer is present in an amount of from 85% to 92.5% by solids weight, based on the total solids weight of the colloidal silica and the polyurethane-acrylic polymer;
   wherein the acrylic polymer has a Tg of from −10° C. to 0° C. and comprises as polymerized units, based on the weight of the acrylic polymer,
   (i) from 1.5% to 2.5% by weight of an ethylenically difunctional or multifunctional compound selected Rom allyl (meth)acrylate, hexanediol di(meth)arcylate, ethylene glycol di(meth)acrylate, neopentyl glycol di(meth)acrylate, butanediol di(meth)acrylate, trimethylolpropane tri(meth)acrylate, or mixtures thereof; and
   (ii) from 97.5% to 98.5% by weight of an ethylenically monofunctional compound selected from a (meth) acrylic acid alkyl ester; and
   wherein the weight ratio of polyurethane to acrylic polymer in the polyurethane-acrylic polymer is from 60/40 to 35/75.

14. A method of preparing an aqueous coating composition of claim 1, comprising: admixing colloidal silica and a polyurethane-acrylic polymer,
   wherein the colloidal silica is present in an amount of from 5% to 30% by solids weight, based on the total solids weight of the colloidal silica and the polyurethane-acrylic polymer, and has an average particle size less than 150 nm;
   wherein the polyurethane-acrylic polymer is present in an amount of from 70% to 95% by solids weight, based on the total solids weight of the colloidal silica and the polyurethane-acrylic polymer, and is obtained by forming an acrylic polymer in an aqueous medium by an emulsion polymerization in the presence of a polyurethane;
   wherein the acrylic polymer having a Tg of from −13° C. to 10° C. comprises as polymerized units, based on the weight of the acrylic polymer,
   (i) from 0.5% to 4% by weight of an ethylenically difunctional or multifunctional compound, and
   (ii) from 96% to 99.5% by weight of an ethylenically monofunctional compound; and
   wherein the weight ratio of polyurethane to acrylic polymer in the polyurethane-acrylic polymer is from 30/70 to 99/1.

* * * * *